US011651601B1

(12) United States Patent
Young (10) Patent No.: US 11,651,601 B1
(45) Date of Patent: May 16, 2023

(54) AUTOMATIC LICENSE PLATE RECOGNITION CAMERA FOR TRAFFIC ENFORCEMENT

(71) Applicant: Conduent Business Services, LLC, Florham Park, NJ (US)

(72) Inventor: Alan William Young, Abingdon (GB)

(73) Assignee: Conduent Business Services, LLC, Florham Park, NJ (US)

( * ) Notice: Subject to any disclaimer, the term of this patent is extended or adjusted under 35 U.S.C. 154(b) by 0 days.

(21) Appl. No.: 17/584,774

(22) Filed: Jan. 26, 2022

(51) Int. Cl.
*H04N 7/18* (2006.01)
*G06V 20/62* (2022.01)
*H04N 5/235* (2006.01)
*H04N 5/225* (2006.01)
*H04N 5/76* (2006.01)
*G06V 20/54* (2022.01)
*H04N 5/77* (2006.01)

(52) U.S. Cl.
CPC ............ *G06V 20/625* (2022.01); *G06V 20/54* (2022.01); *H04N 5/2256* (2013.01); *H04N 5/2351* (2013.01); *H04N 5/2352* (2013.01); *H04N 5/2353* (2013.01); *H04N 5/76* (2013.01)

(58) Field of Classification Search
CPC ...... H04N 5/2353; H04N 5/2256; H04N 5/76; H04N 5/2351; H04N 5/2352; G06V 20/625; G06V 20/54
USPC ........ 386/200, 210, 209, 224, 226; 348/149, 348/148, 143
See application file for complete search history.

(56) References Cited

U.S. PATENT DOCUMENTS

| | | | |
|---|---|---|---|
| 9,501,707 | B2 | 11/2016 | Bulan et al. |
| 9,760,789 | B2 | 9/2017 | Burry et al. |
| 9,965,677 | B2 | 5/2018 | Bulan et al. |
| 10,026,004 | B2 | 7/2018 | Mizes et al. |
| 10,909,845 | B2 | 2/2021 | Bernal et al. |
| 2021/0097306 | A1 | 4/2021 | Crary et al. |
| 2022/0067394 | A1* | 3/2022 | Suksi ................ G06V 10/245 |

FOREIGN PATENT DOCUMENTS

| | | | |
|---|---|---|---|
| CN | 201599775 U | * | 10/2010 |
| JP | 2004312367 A | * | 11/2004 |
| TW | 200913682 A | * | 3/2009 |

OTHER PUBLICATIONS

Conduent Transportation, Conduent Automated License Plate Recognition Solution, Save Time by Automating the Vehicle Identification Process, 2020.

* cited by examiner

Primary Examiner — Robert Chevalier
(74) Attorney, Agent, or Firm — Ortiz & Lopez, PLLC; Kermit D. Lopez; Luis M. Ortiz (57) ABSTRACT

Methods and systems for controlling a camera can involve automatically setting an exposure control for a camera based on data obtained from the camera and using a synchronized infrared flash for video recording by the camera with the exposure control automatically set for the camera. The exposure control can include a managed fixed exposure time controlled with automatic gain correction by the camera. The exposure time for the camera can be fixed. A gain can be monitored, and the exposure time adjusted when an average gain attains a maximum value or a minimum value with changes to ambient light.

20 Claims, 4 Drawing Sheets

AUTOMATIC LICENSE PLATE RECOGNITION CAMERA FOR TRAFFIC ENFORCEMENT

TECHNICAL FIELD

Embodiments are related to Automatic License Plate Recognition (ALPR) methods, systems, and devices. Embodiments also relate to ALPR devices and sensors including ALPR cameras.

BACKGROUND

ALPR is an image-processing approach that often functions as the core module of "intelligent" transportation infrastructure applications. License plate recognition techniques, such as ALPR, can be employed to identify a vehicle by automatically reading a license plate utilizing image processing, computer vision, and character recognition technologies. A license plate recognition operation can be performed by locating a license plate in an image, segmenting the characters in the captured image of the plate, and performing an OCR (Optical Character Recognition) operation with respect to the characters identified.

The ALPR problem may be decomposed into a sequence of image processing operation, for example: locating the sub-image containing the license plate (i.e., plate localization), extracting images of individual characters (i.e., segmentation), and performing optical character recognition (OCR) on these character images. The ability to extract license plate information from images and/or videos is fundamental to the many transportation business. Having an ALPR solution can provide significant improvements for the efficiency and throughput for a number of transportation related business processes.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the embodiments to provide for improved ALPR methods, systems, and devices.

It is another aspect of the embodiments to provide for an improved ALPR camera for use in ALPR applications.

It is a further aspect of the embodiments to provide for a method and system for operating an ALPR camera.

It is yet another aspect to provide managed exposure control for an ALPR camera and synchronized IR flash for video camera by the ALPR camera.

The aforementioned aspects and other objectives and advantages can now be achieved as described herein. In an embodiment, a method for controlling a camera (e.g., ALPR camera) can involve automatically setting an exposure control for a camera based on data obtained from the camera and using a synchronized infrared flash for video recording by the camera with the exposure control automatically set for the camera.

In an embodiment of the method, the exposure control can comprise a managed fixed exposure time controlled with automatic gain correction by the camera.

In an embodiment of the method, automatically setting the exposure control for the camera based on the data obtained from the camera, can further involve fixing an exposure time for the camera.

In an embodiment of the method, automatically setting the exposure control for the camera based on the data obtained from the camera, can involve monitoring a gain and adjusting an exposure time for the camera when an average gain attains a maximum value or a minimum value with changes to ambient light.

In an embodiment of the method, automatically setting the exposure control for the camera based on the data obtained from the camera, can involve establishing a threshold for switching the camera from a day mode to a night mode and switching back to the day mode from the night mode by monitoring an image brightness of images captured by the camera.

In an embodiment of the method, the threshold can comprise a maximum exposure time at a maximum gain.

An embodiment can further involve synchronizing in the night mode, the infrared flash with respect to a camera shutter of the camera to provide a flash for clear images and video at night.

In another embodiment, a system for controlling a camera, can comprise at least one processor and a memory, the memory storing instructions to cause the at least one processor to perform: automatically setting an exposure control for a camera based on data obtained from the camera; and using a synchronized infrared flash for video recording by the camera with the exposure control automatically set for the camera.

In an embodiment of the system, the exposure control can comprise a managed fixed exposure time controlled with automatic gain correction by the camera.

In an embodiment of the system, the instructions for automatically setting the exposure control for the camera based on the data obtained from the camera can be further configured to cause the at least one processor to perform: fixing an exposure time for the camera.

In an embodiment of the system, the instructions for automatically setting the exposure control for the camera based on the data obtained from the camera can be further configured to cause the at least one processor to perform: monitoring a gain and adjusting an exposure time for the camera when an average gain attains a maximum value or a minimum value with changes to ambient light.

In an embodiment of the system, the instructions for automatically setting the exposure control for the camera based on the data obtained from the camera can be further configured to cause the at least one processor to perform: fixing an exposure time for the camera and monitoring a gain and adjusting the exposure time when an average gain attains a maximum value or a minimum value with changes to ambient light.

In an embodiment of the system, the instructions for automatically setting the exposure control for the camera based on the data obtained from the camera can be further configured to cause the at least one processor to perform: establishing a threshold for switching the camera from a day mode to a night mode and switching back to the day mode from the night mode by monitoring an image brightness of images captured by the camera.

In an embodiment of the system, the threshold can comprise a maximum exposure time at a maximum gain.

In an embodiment of the system, the instructions can be further configured to cause the at least one processor to perform: synchronizing in the night mode, the infrared flash with respect to a camera shutter of the camera to provide a flash for clear images and video at night.

In another embodiment, an automatic license plate recognition (ALPR) system, can include an ALPR camera, wherein an exposure control can be automatically set for the ALPR camera based on data obtained from the ALPR camera; and a synchronized infrared flash can be used for video recording by the ALPR camera with the exposure control automatically set for the ALPR camera.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description of the invention, serve to explain the principles of the embodiments.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

After reading this description it will become apparent how to implement the embodiments described in various alternative implementations. Further, although various embodiments are described herein, it is understood that these embodiments are presented by way of example only, and not limitation. As such, this detailed description of various alternative embodiments should not be construed to limit the scope or breadth of the appended claims.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Several aspects of data-processing systems will now be presented with reference to various systems and methods. These systems and methods will be described in the following detailed description and illustrated in the accompanying drawings by various blocks, modules, components, circuits, steps, processes, algorithms, etc., which can be individually or collectively referred to as "elements". These elements may be implemented using, for example, electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

As used herein, the term "video signal" can relate to digital video including digital video signals and the electronic representation of moving visual images (video) in the form of encoded digital video. A video signal including digital video may also include or relate to digital images (e.g., still images). A digital camera can capture, for example, video and still images.

As used herein, the term "scene" can relate to a single image, or a sequence of images, from an imaging device. Thus, a "scene" may also generally refer to one or more images in the imaging device field of view.

The term "characters" or the phrase "characters-of-interest" as used herein generally refer to a string of letters and/or numbers as typically comprise a vehicle license plate number. However, it should be appreciated that the embodiments may be also applicable to detection and reading of other types of character strings or symbols and are not limited solely to license plate recognition.

As will be discussed in greater detail below, an embodiment can be implemented in the context of a civil traffic enforcement system including the use of cameras for enforcing traffic offenses such as bus lane offenses, and parking and moving traffic offenses such as illegal turns. The disclosed embodiments can implement a camera that can use ALPR technology including but not limited to monitoring traffic and reading vehicle license plates and recording an offense when a vehicle is detected. The hardware utilized is not necessarily core to the design and implementation of the embodiments and can be changed without affecting the basic design.

As will be discussed in detail below, a core concept can involve avoiding motion blur by always operating the camera with the shortest exposure time possible. Furthermore, a fixed lens can be used in the context of an automated camera having controls managed by a software application and which can rely on exposure time, gain and flash control. Different settings may be implemented for daylight mode and night mode.

In addition, upper and lower limits for the gain can be set. The utilized software can read the gain value. If the average gain is at the upper limit, this informs that there is insufficient ambient light to maintain clear images at the present fixed exposure time. The software application can send a control command to the camera to increase the exposure time by a fixed increment. The gain automatically adjusts to a lower value in response to this. If the ambient light continues to reduce, this will be repeated until the maximum permissible exposure time is reached. This limit is set by the application software, not by the camera.

At this point the camera is switched to night mode with preconfigured fixed exposure time and gain settings. The flash strobe output can be enabled to drive an infra-red flash in synchronization with the camera shutter. This can continue to operate in the hours of darkness with the software application monitoring the average image brightness over the most recent 10 readings.

If the camera is configured to record video, the infra-red flash can operate in synchronization with the camera shutter to illuminate video images during enforceable hours in night mode. When the brightness increases above a threshold, the software can switch back to daylight mode with fixed exposure time and variable gain and adjusts the exposure time under application control by monitoring the gain as before.

This approach can provide better results for fast moving vehicles at highway speeds than other methods of exposure control as it prioritizes running the camera with the fastest possible exposure time. This eliminates motion blur and also avoids the cost and complication of additional hardware such as external light sensors.

Figure 1:
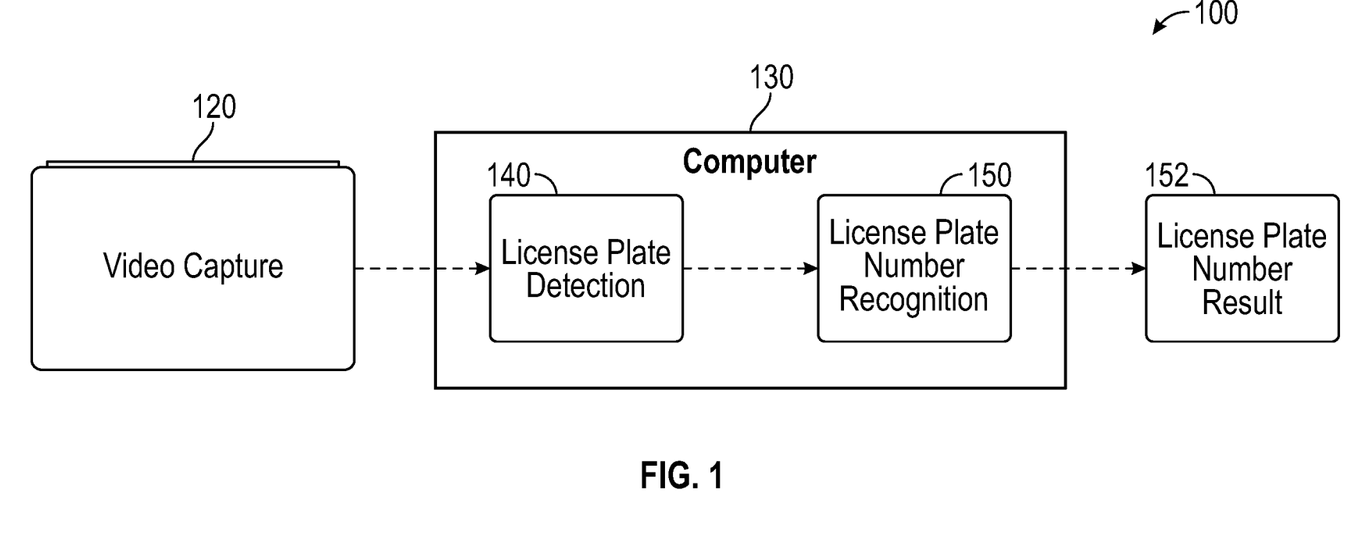
FIG. 1 illustrates a flow diagram of an automatic license plate recognition (ALPR) system, which can be implemented in accordance with an embodiment.
Figure 2:
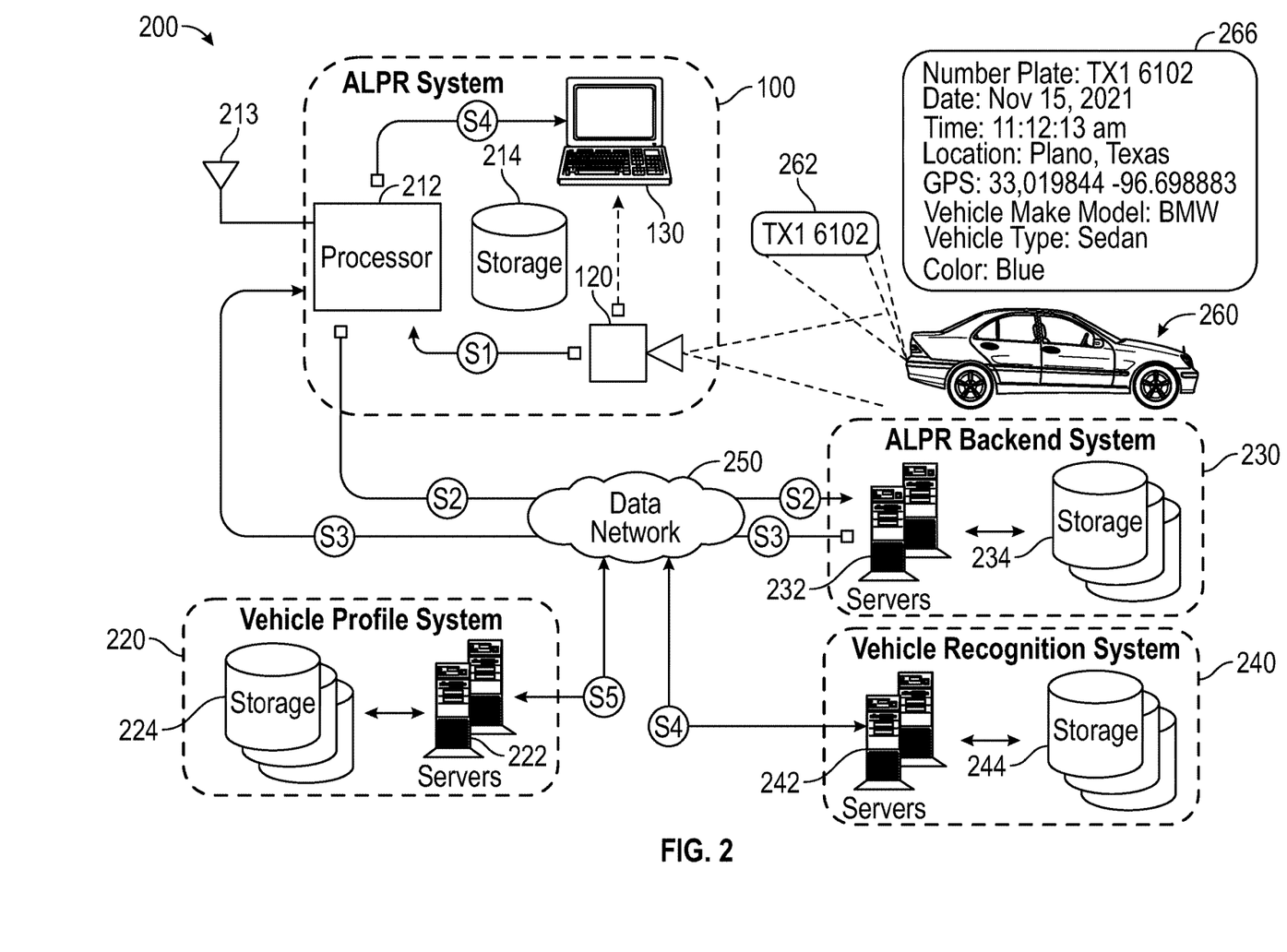
FIG. 2 illustrates a block diagram of a video processing system, which can be implemented in accordance with an embodiment.

FIG. 1 illustrates a flow diagram of an ALPR system 100, which can be implemented in accordance with an embodiment. It should be appreciated that the ALPR system 100 shown in FIG. 1 and the configuration depicted in FIG. 2 are provided herein as exemplary systems and components thereof, which may be adapted for use with one or more embodiments. The embodiments therefore are not limited to the particular system and arrangement shown in FIG. 1 and FIG. 2. That is, other types of ALPR systems and devices may be utilized in place of or in addition to the ALPR system 100 to implement an embodiment.

The ALPR system 100 depicted in FIG. 1 is a data-processing system that can include an image capture system (e.g., ALPR camera) 120 and a computer 130. The image capture system 120 can capture video (e.g., video and/or still images) that can be provided to a license plate detection module 140 that processes the captured video and outputs the processed video to a license plate number recognition module 150. Data 152 indicative of a license plate number result can be output from the license plate number recognition module 150.

Note that in some embodiments, the video capture system 120 may be a part of the computer 130 rather than a separate video capture device or system. The camera 120 shown in FIG. 2, for example, can supply digital images directly to a computer such as the computer 130 shown in FIG. 1.

The ALPR system 100 can be used by security and security and law enforcement personnel, for example, to find and read vehicle license plate numbers in images produced by video cameras and still cameras. The ALPR system 100 can include the video capture system 120 and the computer 130, which can run ALPR software.

The video capture system 120 can capture video or still images and store the captured video and/images as digital image information in the computer 130. The computer's software can then begin the ALPR process by locating a license plate in the image as represented by the digital information. If a license plate is detected in the image, the computer software can perform a character recognition process to "vehicle read" or "read" the license plate number. In addition, the computer software can also identify the country or state where the vehicle is registered.

FIG. 2 illustrates a block diagram of a video processing system 200, which can be implemented in accordance with an embodiment. The video processing system 200 can include the ALPR system 100 shown in FIG. 1. The video processing system 200 can be used to generate a video signal of a scene including a vehicle 260 having a license plate 262 and other identifying features or characteristics and extracting images from the video signal containing the license plate 262. The license plate 262 can include a state name and license plate number (LPN) and characters, such as, alphanumerics, graphics, symbols, logos, shapes and other identifiers. A license plate number is the alphanumeric identifier embossed or printed on a license plate.

The video processing system 200 can include the ALPR system 100, an ALPR backend system 230, a vehicle recognition system 240, and a vehicle identification profile system 220. Each of the respective systems may be communicatively coupled to each other via a data network 250, which may be a wired network and/or a wireless network, for example but not limited to, cellular networks, Wi-Fi, local-area-networks, wide-area-networks, etc. It should be appreciated that the video processing system 200 shown in FIG. 2 represents just one example of a video processing system that can be implemented in accordance with one or more embodiments. That is, other types of video processing systems may be implemented in alternative embodiments in place of the video processing system 200 shown in FIG. 2. Furthermore, the embodiments are not limited to just the particular arrangement shown in FIG. 2.

The ALPR system 100 shown in FIG. 2 may can include the various elements shown in the ALPR system 100 of FIG. 1. The ALPR system 100 may include an imaging system and a video capture system, such as an ALPR camera 120 and a processor 212 running ALPR software stored in a storage device 214 (e.g., memory). The ALPR camera 120 may be a digital video camera. In some embodiments, the ALPR system 100 may be implemented, for example, using techniques similar to those disclosed in U.S. Pat. No. 10,026,004 entitled "Shadow Detection and Removal in License Plate Images," which is assigned to Conduent Business Services, LLC, the disclosure of which is incorporated herein by reference in its entirety.

The ALPR camera 120 can operate as a video imaging device, and can include video camera lenses, electro optics and electronic circuitry for capturing optical images and converting the optical images into a video signal. In some embodiments, the ALPR camera 120 may include one or more of infrared cameras and/or visible light cameras. Infrared or visible light cameras can be used to detect the number and state on the license plate, and visible light cameras can take photographs of the vehicle or driver to use as evidence of the violation. Illumination of the area can be used to improve image quality of the visible light camera, especially in the hours of darkness.

The ALPR system 100 may perform a computationally-intensive license plate detection process in video hardware. In an embodiment, a video imaging device can be used to view a scene and generate a corresponding video signal. The signal from the video imaging device can be processed for license plate detection. Once a license plate is detected, the ALPR may embed license plate coordinates into a video signal. The ALPR system 100 can also implement other processes and features such as shown and described herein with respect to the method 300 depicted in FIG. 3.

In some embodiments, a video capture device can capture the video images from the video signal and an optical character recognition (OCR) engine (not shown in FIG. 2) can execute a license plate reading algorithm running on the computer to process only those video frame(s) of the video signal containing the license plate 262. The aforementioned OCR engine can produce a read and confidence level (also referred to herein as a confidence value and/or probability value) associated with processed frame received by an OCR engine by extracting and correctly identifying the characters from the license plate number in the image. "Reading," "reads," or "read accuracy" means the machine interpretation of the license plate number or character contained on a license plate.

The ALPR system 100 may be a stationary ALPR system or a fixed ALPR system, for example, having a fixed ALPR camera disposed along a roadway coupled to a termination box (e.g., ALPR processor) that may be communicatively coupled via data network 250 to ALPR backend system 230. In another embodiment, the ALPR system may be a mobile system, for example, having an ALPR camera disposed on a vehicle coupled to an ALPR processor disposed thereon. In some embodiments, the ALPR processor may be coupled to the computer 130, which provides a user interface.

The ALPR camera 120 can generate a video signal of the scene including vehicle 260 and the license plate 262. The video signal can be communicated to the ALPR processor 212 at S1, which can execute license plate detection processes to identify image frames of the video signal containing license plate 262. The identified frames can be extracted and processed by an OCR engine to produce a read for each identified frame. The read can comprise image data of the extracted frame and metadata of the identified of the characters from the license plate number of license plate 262 and a determined confidence value for the read. The read may be stored in local ALPR storage 214 or stored at the ALPR backend system 230. Each read may be communicated over network 250, via antenna 213, to the ALPR backend system 230 as S2.

Note that reference herein to the use of an 'OCR engine' is provided herein for exemplary purposes only. It should be appreciated that the embodiments may be implemented with non-OCR approaches. For example, the techniques disclosed in U.S. Pat. No. 9,965,677 entitled "Method and System for OCR-Free Vehicle Identification Number Localization" may be implemented in accordance with an alternative embodiment. U.S. Pat. No. 9,965,677, which is incorporated herein by reference in its entirety, is assigned to Conduent Business Services, LLC.

The ALPR backend system 230 may include sever(s) 232 and a database 234 also labeled as 'Storage' in FIG. 2. The ALPR backend system 230 may be configured as a central repository for read data and can include software modules to support data analysis, queries, and reporting. The server(s) 232 can communicate bidirectionally with the database 234 as indicated by the double arrow shown in the ALPR backend system 230.

The ALPR backend system 230 may interface with other remote database of interest, for example, NCIC, DMV, DOJ, etc. At S3, database information, for example, in response data queries, may be communicated back to the ALPR system 100, for example, where the ALPR system 100 is a mobile ALPR system. If the ALPR system 100 is a fixed system, the computer 130 may be remote from ALPR system 100 and communicatively coupled instead to the ALPR backend system 230.

Queries based on a read may be used to access a remote database, such as a DMV (Department of Motor Vehicles) database, and retrieve identifying information 266 corresponding to the license plate 262. In some embodiments, the identifying information 266 may be associated with the read as descriptors in the form of metadata. In the example shown in FIG. 2, the identifying information 266 associated with the vehicle 260 can include the license plate number (e.g., TX1 6102) and other information such as the date the information was captured by the ALPR system 100, the location where the information was captured (e.g., Plano, Tex.), vehicle make, vehicle color, vehicle type, and so on.

In various embodiments, the video processing system 200 can include a vehicle recognition system 240. In an embodiment, the vehicle recognition system 240 may include one or more server(s) 242 and a database 244 that can be communicatively coupled to the video processing system 200 via the data network 250. The database 244 is labeled as 'Storage' in FIG. 2. Note that the term 'server' as utilized herein relates to a data-processing apparatus, computer or system that can provide resources, data, services or programs to other computers, known as clients, over a network. The server(s) 242 may communicate bidirectionally with the database 244 as indicated by the double arrow shown within the vehicle recognition system 240.

In another embodiment, the vehicle recognition system 240 may be integrated into the ALPR system 100 or ALPR backend system 230, for example, as a feature recognition and classification engine. The vehicle recognition system 240 may be receive image data of each read execute object detection algorithms to identify, extract, and classify distinctive visual features or characteristics of the vehicle 260 associated with the license plate 262. Example feature recognition algorithms include, but are not limited to, optical character recognition, edge detection, corner detection, blob detection, ridge detection, etc.

The vehicle recognition system 240 can produce one or more descriptors and corresponding confidence levels for each feature identified in a given read frame by extracting and identifying the features and retrieving descriptors corresponding to the identified features from a database. The descriptors and confidence levels can be embedded into the read as metadata.

In various embodiments, each read may be communicated to the vehicle recognition system 240 at S4 for processing to identify distinguishing visual features or characteristics of the vehicle 260, generating metadata including descriptors of the identified features and corresponding confidence levels, and associating the metadata with each read. The descriptors, confidence levels, reads, and associations there between may be stored in the database 244.

In some embodiments, the reads and associated descriptors can be communicated to a vehicle identification profile system 220 at S5 that can build a profile of the vehicle 260 based on a plurality of reads, descriptors, and confidence levels associated therewith. The vehicle profile system 220 can include a database 224 (labeled as 'Storage' in FIG. 2) that can communicate bidirectionally with one or more server(s) 222.

The reads (e.g., image data of each frame containing a license plate 262) and metadata (e.g., license plate number, descriptors, and confidence levels) may be stored in databases 224 and/or 244. In some embodiments, the vehicle identification profile system 220 and the vehicle recognition system 240 may be integrated into the ALPR system 100 and/or the ALPR backend system 230 as, for example, software modules for executing processes associated therewith. As such, the database 234 may be configured as a central repository for all read data and descriptor metadata.

Figure 3:
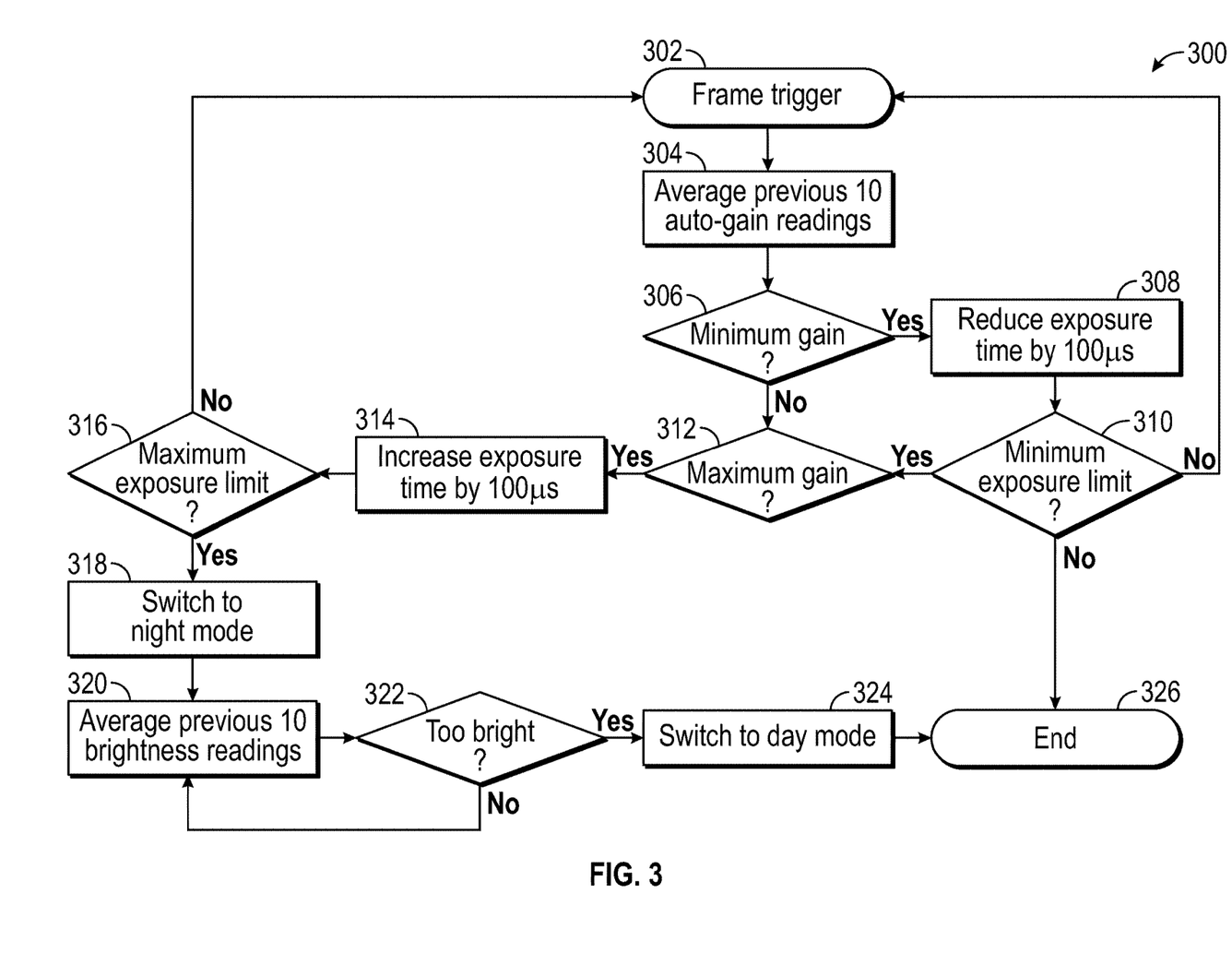
FIG. 3 illustrates a flow chart of operations depicting logical operational steps of a method of operating an ALPR camera in accordance with an embodiment.

FIG. 3 illustrates a flow chart of operations depicting logical operational steps of a method 300 of operating an ALPR camera in accordance with an embodiment. The method 300 shown in FIG. 3 can be used to implement managed exposure control logic for an ALPR camera such as the ALPR camera 120 depicted in FIG. 2. If the ALPR camera 120. As depicted at block 302, a frame triggering operation can be implemented. Next, as shown at block 304, a step or operation can be implemented to average the previous ten auto-gain readings by the ALPR camera 120.

Thereafter, as described at decision block 306, a step or operation can be implemented to determine if the average of a previous number (e.g., ten) auto-gain readings of the ALPR camera 120 is a minimum gain. Note that the number of readings is configurable within a range.

If the answer is 'yes' then as shown at block 308, a step or operation can be implemented to reduce the exposure time of the ALPR camera by a fixed step size (e.g., 100 µs). Note that the fixed step size is configurable within a range. In practice, when we get close to zero, we can switch to a multiplier instead of a fixed step size, otherwise the camera may crash trying to set the exposure time to zero.

Next, as depicted at decision block 310, a step or operation can be implemented to determine if a minimum exposure limit has been achieved. If the determination with respect to decision block 310 is 'no' the process ends, as indicated at block 326. If the determination with respect to decision block 310 is 'yes', then the operation described at decision block 312 can be implemented. That is, as shown at decision block 312, a test can be implemented to determine if a maximum gain has been achieved. Note that if the answer with respect to the decision block 306 discussed above is 'no', the step or operation depicted at decision block 312 can be implemented.

Following completion of the step or operation indicated at block 312, a step or operation can be implemented as described at block 314 to increase the exposure time of the ALPR camera 120 by 100 µs. Thereafter, as described at decision block 316, a test can be performed to determine if a maximum exposure limit has been met. If the answer is 'no' then the step or operation shown at block 302 can be repeated, and so on. If the answer with respect to decision block 316 is 'yes', then a step or operation can be implemented as shown at block 318 to switch to a night mode.

Following implementation of the step or operation depicted at block 318, a step or operation can be implemented to average the previous 10 brightness readings of the ALPR camera 120, as shown at block 320. Next, as illustrated at decision block 322, step or operation can be implemented to determine if the determined average brightness (from block 320) is too bright. If the answer is 'no' then the step or operation shown at block 320 is repeated, and so on. If the answer is 'yes' then a step or operation can be implemented to switch to a day mode, as shown at block 324. The process can then end, as depicted at block 326.

The method 300 can allow the ALPR camera 120 to detect a license plate such as the license plate 262 in a region of interest. The license plate 262 can be read using an ALPR system such as the ALPR system 100 and compared against a list of exempt vehicles. An example of this is a list of bus license plates for bus lane enforcement. An offence can be recorded for each non-exempt vehicle. This may include a video clip and/or a context image, and/or a plate image. This data can be encrypted and sent to a configured endpoint.

The automatic camera exposure control provided by method 300 can be implemented in some embodiments as a custom design. Traffic cameras must run at a fast exposure time to avoid motion blur, but this often results in dark images in low light conditions. To solve this, the ALPR camera 120 can be run at a managed fixed exposure time controlled with automatic gain correction on the ALPR camera 120. The gain can be monitored, and the exposure time adjusted under software control if the average gain reaches its maximum or minimum value with changes to ambient light. The method 300 can provide for another threshold (maximum exposure time at maximum gain) for switching from day to night mode then switching back to day mode by monitoring the image brightness. This feature is depicted in, for example, block 318, block 320, block 322, and block 324 of FIG. 3. In night mode, for example, we can synchronize an IR flash to the camera shutter of the ALPR camera 120 to provide an "invisible" flash for clear images and video at night.

There are alternative ways to monitor camera exposure, but conventional methods are likely to have a higher number of unusable images, overexposed or too dark, in more extreme lighting conditions. The absence of bad images may indicate a use of an embodiment. It can also be determined from any video recordings whether a synchronized flash is being used. It is common for a synchronized flash to be used for still image capture, but not video as with the disclosed embodiments.

An alternative embodiment may involve the use of a fixed exposure time and variable gain or variable aperture. These are standard features configurable on most cameras. The reason that the disclosed embodiments is better is that we can operate effectively in dark and very bright lighting conditions where the conventional methods would produce a range of dark or overexposed images with motion blur on high speed target vehicles.

A core concept of the embodiments involves avoiding motion blur by always operating the camera with the shortest exposure time (shutter speed) possible. The control method 300 depicted in FIG. 3 can involve the use of a manual lens of fixed focal length to be used with the focus and aperture set to fixed positions at the time of installation. Automated camera controls managed by the software application can rely on exposure time, gain, and flash I/O control. There are different settings for daylight and night mode.

When the ALPR camera 120 starts, the software application running the method 300, for example, can assume daylight mode and start the ALPR camera 120 with a fixed exposure time and an automatic gain. Upper and lower limits for the automatic gain can be specified and the ALPR camera can automatically adjust between those limits uncontrolled by the software application. The software application can read the gain values and averages them over the most recent ten readings. If the average gain is at the upper limit, this informs that there is insufficient ambient light to maintain clear images at the present fixed exposure time. The software application can send a control command to the camera to increase the exposure time by a fixed increment (e.g., 100 µs). The gain can automatically adjust to a lower value in response to this. If the ambient light continues to reduce, this can be repeated until the maximum permissible exposure time is attained. This limit can be set by the application software, not by the camera.

At this point the ALPR camera 120 can switch to night mode with a fixed exposure time and fixed gain. The flash strobe output can be enabled to drive an IR flash in synchronization with the ALPR camera shutter. The ALPR camera 120 can continue to operate in the hours of darkness with the software application monitoring the average image brightness over the most recent 10 readings.

If the ALPR camera 120 is configured to record video, the IR flash can operate in synchronization with the camera shutter to illuminate video images during enforceable hours in night mode.

When the brightness increases above a preset threshold, the application software implemented method 300 can assume it is daylight again and can switch back to daylight mode. The ALPR camera 120 can start with a configured fixed exposure time and a variable gain and then adjust the exposure time under application control by monitoring the gain as before. In a similar way, if the minimum gain is attained, the software application implementing method 300 may assume that the ambient light is too bright for the present exposure setting and can reduce the exposure time by a fixed increment (e.g., 100 µs).

Some embodiments may be implemented in the context of, for example, a civil traffic enforcement camera to provide an effective way of enforcing traffic offences such as bus lane, parking and moving traffic offences such as illegal turns. The camera 120, for example, can use the disclosed ALPR technology to monitor traffic, read license plates and record an offence when a vehicle is detected. The hardware is not necessarily core to the design and can be changed without affecting the basic design. As discussed, a core concept can involve avoiding motion blur by always operating the camera with the shortest exposure time possible.

A fixed lens may be used. Automated camera controls managed by a software application can rely on exposure time, gain, and flash control. There are different settings for daylight and night mode.

Furthermore, upper and lower limits for the gain can be set. The software can read the gain value. If the average gain is at the upper limit, this can inform that there is insufficient ambient light to maintain clear images at the present fixed exposure time. The software application can send a control command to the camera to increase the exposure time by a fixed increment. The gain can automatically adjust to a lower value in response to this. If the ambient light continues to reduce, this can be repeated until the maximum permissible exposure time is reached. This limit can be set by the application software, not by the camera.

At this point the camera can switch to night mode with a fixed exposure time and fixed gain. The flash strobe output can be enabled to drive an infra-red flash in synchronization with the camera shutter. This can continue to operate in the hours of darkness with the software application monitoring the average image brightness over the most recent, for example, 10 readings.

If the camera 120 is configured to record video, the infrared flash can operate in synchronization with the camera shutter to illuminate video images during enforceable hours in night mode. When the brightness increases above a threshold, the software can switch back to daylight mode with fixed exposure time and variable gain and adjusts the exposure time under application control by monitoring the gain as before. This approach can provide better results for fast moving vehicles at highway speeds than other methods/techniques and systems of exposure control as it prioritizes running the camera 120 with the fastest possible exposure time. It also avoids the cost and complication of additional hardware such as external light sensors.

Thus, if the camera detects a license plate in a region of interest, it can be read using an ALPR engine and compared against a list of exempt vehicles. An example of this is a list of bus license plates for bus lane enforcement. An offence can be recorded for each non-exempt vehicle. This may include a video clip and/or a context image, and/or a plate image. This data is encrypted and sent to a configured endpoint. The automatic camera exposure control is a custom design, which I believe to be unique. Traffic cameras must run at a fast exposure time to avoid motion blur, but this often can result in dark images in low light conditions. To solve this problem, we can run at a managed fixed exposure time controlled by the application with automatic gain correction on the camera. We can monitor the gain and adjust the exposure time under software control if the average gain reaches its maximum or minimum value with changes to ambient light. We can have another threshold (e.g., maximum exposure time at maximum gain) for switching from day to night mode then switch back to day mode by monitoring the image brightness. In night mode we can synchronize an infrared flash to the camera shutter to provide an "invisible" flash for clear images and video at night.

Figure 4:
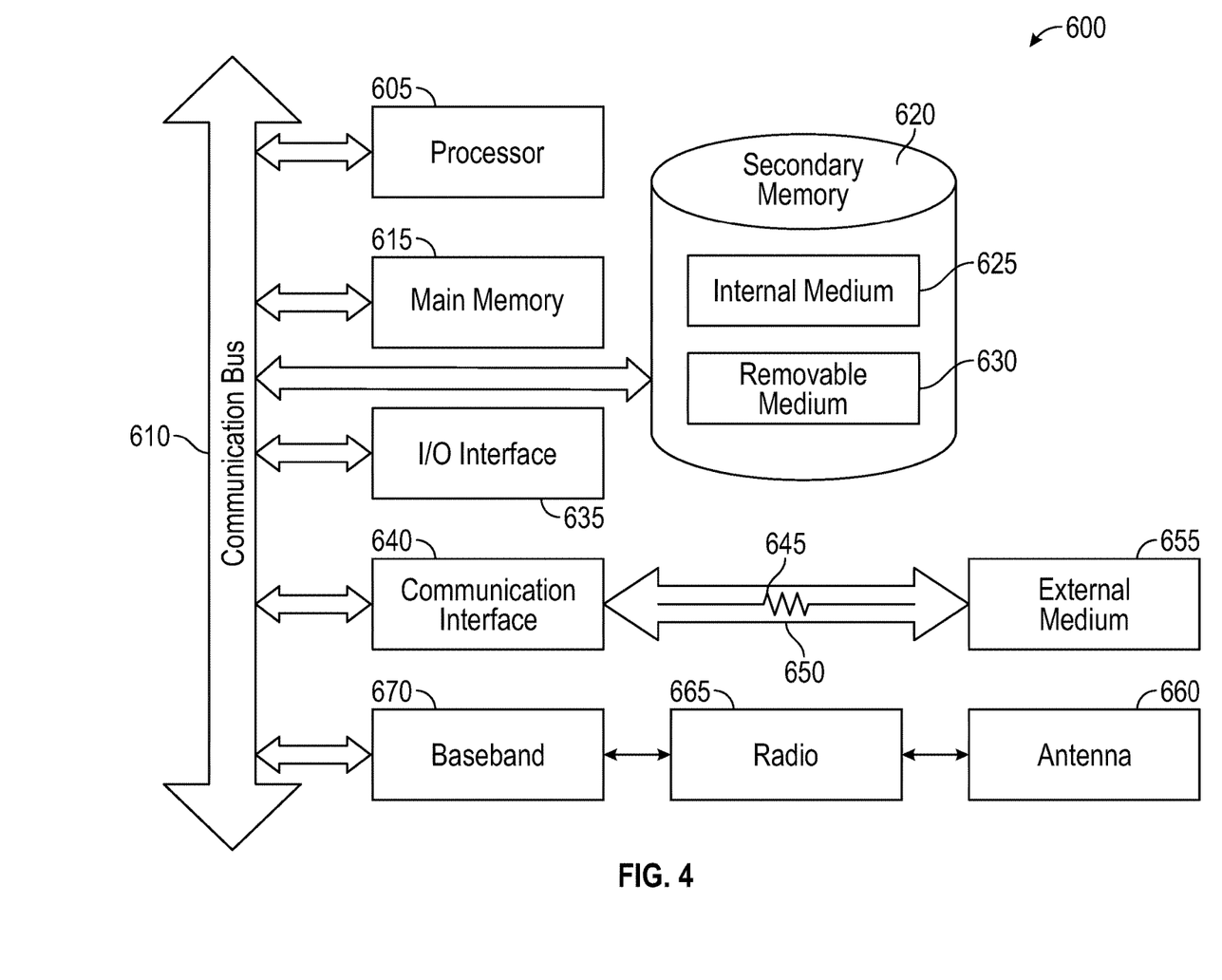
FIG. 4 illustrates a block diagram of a computing system can be adapted for use with an embodiment.

FIG. 4 illustrates a block diagram of a computing system 600 that can be adapted for use with an embodiment. Note that the term 'computing system' as utilized herein can also refer to a 'computer', a 'computing device' or a 'data-processing apparatus'. The computing system 600 can be implemented as a wired and/or wireless computer device suitable for use in one or more embodiments. The computing system 600 may be used to implement the ALPR system 210, the ALPR backend system 230, the vehicle recognition system 240, the vehicle identification profile system 220, and/or the computer 130 depicted in FIG. 2. The computing system 600 may be programmed with software comprising instructions that, when executed by at least one processor, cause the computer 130 to perform the various steps, operations, instructions, functions, processes, and/or methods described herein, for example, as described in connection to FIGS. 1-3. In some embodiments, the computer 130 may run a software application that can perform the various steps or operations described and illustrated herein with respect to FIG. 3.

In various embodiments, the computing system 600 can be a conventional personal computer, computer server, personal digital assistant, smart phone, tablet computer, or any other processor-enabled device that is capable of wired or wireless data communication. A server is an example of a type of computing system. Other computer systems and/or architectures may be also used, as will be clear to those skilled in the art. The computer system 600 is an example of a system that may be utilized to implement, for example, one or more of the servers 222, 234, and 244 shown in FIG. 2. The computer system 600 may also implement, for example, the ALPR system 100 and/or the computer 100 shown in FIG. 1 and FIG. 2. Specific components of the computing system 600 may also be used to implement particular components of the configurations shown in FIG. 1 and FIG. 2. For example, the main memory 615 and/or the secondary storage 620 may be or may implement the storage 214 depicted in FIG. 2. Likewise, the processor 605 may be or may implement the processor 212 shown in FIG. 2.

The computing system 600 preferably includes one or more processors, such as processor 605. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 605.

The processor 605 is preferably connected to a communication bus 610. The communication bus 610 may include a data channel for facilitating information transfer between storage and other peripheral components of the computing system 600. The communication bus 610 further may provide a set of signals used for communication with the processor 605, including a data bus, address bus, and control bus (not shown). The communication bus 610 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPM"), IEEE 696/S-100, and the like.

Computing system 600 preferably includes a main memory 615 and may also include a secondary memory 620. The main memory 615 provides storage of instructions and data for programs executing on the processor 605. For example, the main memory 615 may provide storage for modules or engines, a graphical user interface and so on, which may be representative of software modules or engine that, when executed by the processor 605, cam perform the functions described in FIGS. 1-3, and elsewhere herein. As another example, the main memory 615 may be illustrative of one or more of storage device 214 and/or databases 234, 224, and/or 244 and thus can provide storage of the data and information stored therein. The main memory 615 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 620 may optionally include an internal memory 625 and/or a removable storage medium 630, for example a floppy disk drive, a magnetic tape drive, a compact disc ("CD") drive, a digital versatile disc ("DVD") drive, etc. The removable storage medium 630 can be read from and/or written to in a well-known manner. Removable storage medium 630 may be, for example, a floppy disk, magnetic tape, CD, DVD, SD card, etc.

The removable storage medium 630 is a non-transitory computer readable medium having stored thereon computer executable code (i.e., software) and/or data. The computer software or data stored on the removable storage medium 630 is read into the computing system 600 for execution by the processor 605.

In alternative embodiments, the secondary memory 620 may include other similar means for allowing computer programs or other data or instructions to be loaded into the computing system 600. Such means may include, for example, an external storage medium 655 and a communication interface 640. Examples of external storage medium 655 may include an external hard disk drive or an external optical drive, or and external magneto-optical drive.

Other examples of secondary memory 620 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are the removable storage medium 630 and a communication interface, which allow software and data to be transferred from an external storage medium 655 to the computing system 600.

The Computing system 600 may also include an input/output ("I/O") interface 635. The I/O interface 635 facilitates input from and output to external devices. For example, the I/O interface 635 may receive input from a keyboard, mouse, touch screen, gestures detecting camera, speech command module, etc. and may provide output to a display generated by the graphical user interface. The I/O interface 635 is capable of facilitating input from and output to various alternative types of human interface and machine interface devices alike.

The computing system 600 may also include a communication interface 640. The communication interface 640 can allow software (e.g., a software application) and data to be transferred between computing system 600 and external devices (e.g., printers), networks, or information sources. For example, computer software or executable code may be transferred to computing system 600 from a network server via communication interface 640. Examples of communication interface 640 include a modem, a network interface card ("NIC"), a wireless data card, a communications port, a PCMCIA slot and card, an infrared interface, and an IEEE 1394 fire-wire, just to name a few.

Communication interface 640 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/

Internet protocol ("TCP/IP"), serial line Internet protocol/point to point protocol ("SLIP/PPP"), and so on, but may also implement customized or non-standard interface protocols as well.

Software and data transferred via the communication interface 640 are generally in the form of the electrical communication signals 645. The electrical communication signals 645 are preferably provided to the communication interface 640 via a communication channel 650. In one embodiment, the communication channel 650 may be a wired or wireless network, or any variety of other communication links. The communication channel 650 carries the electrical communication signals 645 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 615 and/or the secondary memory 620. Computer programs can also be received via the communication interface 640 and stored in the main memory 615 and/or the secondary memory 620. Such computer programs, when executed, enable the computing system 600 to perform the various functions of the embodiments as previously described.

In this description, the term "computer readable medium" can be used to refer to any non-transitory computer readable storage media used to provide computer executable code (e.g., software and computer programs) to the computing system 600. Examples of these media include the main memory 615, the secondary memory 620 (including the internal memory 625, the removable storage medium 630, and the external storage medium 655), and any peripheral device communicatively coupled with the communication interface 640 (including a network information server or other network device). These non-transitory computer readable mediums are means for providing executable code, programming instructions, and software to the computing system 600.

In an embodiment that is implemented using software, the software may be stored on a computer readable medium and loaded into the computing system 600 by way of removable storage medium 630, I/O interface 635, or communication interface 640. In such an embodiment, the software is loaded into the computing system 600 in the form of electrical communication signals 645. The software, when executed by the processor 605, preferably causes the processor 605 to perform the inventive features and functions previously described herein.

The computing system 600 also includes optional wireless communication components that facilitate wireless communication over a voice and over a data network. The wireless communication components can comprise an antenna system 660, a radio system 665 and a baseband system 670. In the computing system 600, radio frequency ("RF") signals are transmitted and received over the air by the antenna system 660 under the management of the radio system 665.

In one embodiment, the antenna system 660 may comprise one or more antennae and one or more multiplexors (not shown) that perform a switching function to provide the antenna system 660 with transmit and receive signal paths. In the receive path, received RF signals can be coupled from a multiplexor to a low noise amplifier (not shown) that amplifies the received RF signal and sends the amplified signal to the radio system 665.

In alternative embodiments, the radio system 665 may comprise one or more radios that are configured to communicate over various frequencies. In one embodiment, the radio system 665 may combine a demodulator (not shown) and modulator (not shown) in one integrated circuit ("IC"). The demodulator and modulator can also be separate components. In the incoming path, the demodulator strips away the RF carrier signal leaving a baseband received audio signal, which is sent from the radio system 665 to the baseband system 670.

If the received signal contains audio information, then baseband system 670 decodes the signal and converts it to an analog signal. Then the signal is amplified and sent to a speaker. The baseband system 670 also receives analog audio signals from a microphone. These analog audio signals are converted to digital signals and encoded by the baseband system 670. The baseband system 670 also codes the digital signals for transmission and generates a baseband transmit audio signal that is routed to the modulator portion of the radio system 665. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 660 where the signal is switched to the antenna port for transmission.

The baseband system 670 can also be communicatively coupled with the processor 605. The processor 605 has access to one or more data storage areas including, for example, but not limited to, the main memory 615 and the secondary memory 620. The processor 605 is preferably configured to execute instructions (i.e., computer programs or software) that can be stored in the main memory 615 or in the secondary memory 620. Computer programs can also be received from the baseband system 670 and stored in the main memory 615 or in the secondary memory 620 or executed upon receipt. Such computer programs, when executed, enable the computing system 600 to perform the various functions of the embodiments as previously described. For example, the main memory 615 may include various software modules (not shown) that can be executable by processor 605.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that may be specific to a given function.

In one or more exemplary aspects, the functions described can be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor.

By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

While various embodiments have been described above, it should be understood that they have been presented by way of example only, and not of limitation. The breadth and scope should not be limited by any of the above-described example embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components can be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases can be absent.

While various embodiments have been described above, it is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Furthermore, the functionalities including operations, steps and instructions described herein may be implemented entirely and non-abstractly as physical hardware, entirely as physical non-abstract software (including firmware, resident software, micro-code, etc.) or combining non-abstract software and hardware implementations that may all generally be referred to herein as a "circuit," "module," "engine", "component," "block", "database", "agent" or "system." Furthermore, aspects of the embodiments may take the form of a computer program product embodied in one or more non-ephemeral computer readable media having computer readable and/or executable program code embodied thereon. The term "engine" in particular can relate to a "software engine".

Although not required, the disclosed embodiments can be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, modules implemented as program modules may include, but are not limited to, routines, subroutines, software applications, programs, objects, components, data structures, etc., that can perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like. An example of a module is a software application that can implement the various steps, operations or instructions described herein with respect to FIG. 1 to FIG. 3.

Note that the term module as utilized herein can refer to a collection of routines and data structures, which can perform a particular task or can implement a particular data type. A module can be composed of two parts: an interface, which lists the constants, data types, variable, and routines that can be accessed by other modules or routines, and an implementation, which is typically private (accessible only to that module), and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that can be a combination of hardware and software. It should be appreciated that implementation and processing of the disclosed modules, whether primarily software-based and/or hardware-based or a combination thereof, according to the approach described herein can lead to improvements in processing speed and ultimately in energy savings and efficiencies in a data-processing system such as, for example, the ALPR system 100 described herein.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for controlling a camera, comprising:
   automatically setting an exposure control for a camera based on data obtained from the camera; and
   using a synchronized infrared flash for video recording by the camera with the exposure control automatically set for the camera.

2. The method of claim 1 wherein the exposure control comprises a managed fixed exposure time controlled with automatic gain correction by the camera.

3. The method of claim 1 wherein automatically setting the exposure control for the camera based on the data obtained from the camera, further comprises:
   fixing an exposure time for the camera.

4. The method of claim 1 wherein automatically setting the exposure control for the camera based on the data obtained from the camera, further comprises:
   monitoring a gain and adjusting an exposure time for the camera when an average gain attains a maximum value or a minimum value with changes to ambient light.

5. The method of claim 1 wherein automatically setting the exposure control for the camera based on the data obtained from the camera, further comprises:
   fixing an exposure time for the camera; and
   monitoring a gain and adjusting the exposure time when an average gain attains a maximum value or a minimum value with changes to ambient light.

6. The method of claim 1 wherein automatically setting the exposure control for the camera based on the data obtained from the camera, further comprises:
   establishing a threshold for switching the camera from a day mode to a night mode and switching back to the day mode from the night mode by monitoring an image brightness of images captured by the camera.

7. The method of claim 6 wherein the threshold comprises a maximum exposure time at a maximum gain.

8. The method of claim 6 further comprising synchronizing in the night mode, the infrared flash with respect to a camera shutter of the camera to provide a flash for clear images and video at night.

9. A system for controlling a camera, comprising:
   at least one processor and a memory, the memory storing instructions to cause the at least one processor to perform:
   automatically setting an exposure control for a camera based on data obtained from the camera; and
   using a synchronized infrared flash for video recording by the camera with the exposure control automatically set for the camera.

10. The system of claim 9 wherein the exposure control comprises a managed fixed exposure time controlled with automatic gain correction by the camera.

11. The system of claim 9 wherein the instructions for automatically setting the exposure control for the camera based on the data obtained from the camera are further configured to cause the at least one processor to perform:
    fixing an exposure time for the camera.

12. The system of claim 9 wherein the instructions for automatically setting the exposure control for the camera based on the data obtained from the camera are further configured to cause the at least one processor to perform:
    monitoring a gain and adjusting an exposure time for the camera when an average gain attains a maximum value or a minimum value with changes to ambient light.

13. The system of claim 9 wherein the instructions for automatically setting the exposure control for the camera based on the data obtained from the camera are further configured to cause the at least one processor to perform:
    fixing an exposure time for the camera; and
    monitoring a gain and adjusting the exposure time when an average gain attains a maximum value or a minimum value with changes to ambient light.

14. The system of claim 9 wherein the instructions for automatically setting the exposure control for the camera based on the data obtained from the camera are further configured to cause the at least one processor to perform:
    establishing a threshold for switching the camera from a day mode to a night mode and switching back to the day mode from the night mode by monitoring an image brightness of images captured by the camera.

15. The system of claim 9 wherein the threshold comprises a maximum exposure time at a maximum gain.

16. The system of claim 9 wherein the instructions are further configured to cause the at least one processor to perform: synchronizing in the night mode, the infrared flash with respect to a camera shutter of the camera to provide a flash for clear images and video at night.

17. An automatic license plate recognition (ALPR) system, comprising:
- an ALPR camera, wherein an exposure control is automatically set for the ALPR camera based on data obtained from the ALPR camera; and
- a synchronized infrared flash is used for video recording by the ALPR camera with the exposure control automatically set for the ALPR camera.

18. The ALPR system of claim 17 wherein the exposure control comprises a managed fixed exposure time controlled with automatic gain correction by the ALPR camera.

19. The system of claim 17 wherein an exposure time for the ALPR camera is fixed.

20. The system of claim 19 wherein a gain is monitored, and the exposure time is adjusted when an average gain attains a maximum value or a minimum value with changes to ambient light.

\* \* \* \* \*